(12) United States Patent
Belenky et al.

(10) Patent No.: US 11,194,933 B2
(45) Date of Patent: Dec. 7, 2021

(54) CIRCUITS SUPPORTING IMPROVED SIDE CHANNEL AND FAULT INJECTION ATTACK RESISTANCE

(71) Applicant: Intel Corporation, Santa Clara, CA (US)

(72) Inventors: Yaacov Belenky, Maale Adumim (IL); Gyora Benedek, Kiryat Bialik (IL); Reuven Elbaum, Haifa (IL); David Novick, Beaverton, OR (US); Elad Peer, Yokneam Illit (IL); Chaim Shen-Orr, Haifa (IL); Yonatan Shlomovich, Givat-Ada (IL)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 16/431,153

(22) Filed: Jun. 4, 2019

(65) Prior Publication Data
US 2019/0286853 A1   Sep. 19, 2019

(51) Int. Cl.
*H04L 29/06* (2006.01)
*G06F 21/72* (2013.01)
(Continued)

(52) U.S. Cl.
CPC ............ *G06F 21/72* (2013.01); *G06F 21/567* (2013.01); *G06F 21/602* (2013.01); *H04L 9/004* (2013.01);
(Continued)

(58) Field of Classification Search
CPC .......... G06F 21/70; G06F 21/71; G06F 21/72; G06F 21/75; G06F 21/755;
(Continued)

(56) References Cited

U.S. PATENT DOCUMENTS

2003/0194086 A1* 10/2003 Lambert ................ H04L 9/003
380/44
2007/0005512 A1* 1/2007 Nishiguchi ............. G06F 21/72
705/71

(Continued)

OTHER PUBLICATIONS

Waksman, Abraham, "A Permutation Network," Standford Research Institute, Feb. 1967, Menlo Park, California, retrieved from <https://grid.cs.gsu.edu/~wkim/index_files/permutation_network.pdf>, 5 pages.

(Continued)

*Primary Examiner* — Malcolm Cribbs
(74) *Attorney, Agent, or Firm* — Alliance IP, LLC

(57) ABSTRACT

The present disclosure is directed to systems and methods to protect against SCA and fault injection attacks through the use of a temporary or ephemeral key to cryptographically alter input data portions. Universal resistant block (URB) circuitry receives a seed data value and a at least one secret key data value and generates an ephemeral key output data value. Cryptographic circuitry uses the ephemeral key data value to transform an input data portion to produce an transformed output data portion. The use of an SCA or fault injection attack on the transformed output data portion will reveal only the ephemeral key data value and not the at least one secret key data value. Further, where a unique ephemeral key data value is used to transform each input data portion, an attacker cannot discover the ephemeral key in a piecemeal manner and must instead discover the complete ephemeral key data value—significantly increasing the difficulty of performing a successful SCA or fault injection attack.

24 Claims, 11 Drawing Sheets

(51) Int. Cl.
*H04L 9/08* (2006.01)
*G06F 21/60* (2013.01)
*G06F 21/56* (2013.01)
*H04L 9/06* (2006.01)
*H04L 9/00* (2006.01)

(52) U.S. Cl.
CPC .......... *H04L 9/0643* (2013.01); *H04L 9/0662* (2013.01); *H04L 9/088* (2013.01); *H04L 9/0861* (2013.01); *H04L 9/0869* (2013.01); *G06F 2221/034* (2013.01)

(58) Field of Classification Search
CPC .... G06F 2221/034; G06F 21/76; G06F 21/86; G06F 21/87; G06F 21/567; G06F 21/602; H04L 9/002; H04L 9/0869; H04L 9/088; H04L 9/003; H04L 9/004; H04L 9/0643; H04L 9/0662; H04L 9/0861
See application file for complete search history.

(56) References Cited

U.S. PATENT DOCUMENTS

| | | | | |
|---|---|---|---|---|
| 2008/0008322 A1* | 1/2008 | Fontana | ............... | H04L 9/0869 380/277 |
| 2011/0038481 A1* | 2/2011 | Modave | .................. | G07F 7/10 380/277 |
| 2011/0099376 A1* | 4/2011 | Gupta | .................. | H04L 9/3247 713/171 |
| 2012/0047371 A1* | 2/2012 | Woodall | .................. | G06F 21/76 713/189 |
| 2012/0170751 A1* | 7/2012 | Wurm | .................. | H04L 9/0897 380/278 |
| 2012/0314867 A1* | 12/2012 | Tomaru | ..................... | H04L 9/08 380/270 |
| 2013/0243194 A1* | 9/2013 | Hawkes | ................ | H04L 9/0841 380/270 |
| 2014/0086406 A1* | 3/2014 | Polzin | .................. | H04L 9/0822 380/44 |
| 2016/0140335 A1* | 5/2016 | Proulx | .................. | H04L 63/083 726/6 |
| 2016/0314295 A1* | 10/2016 | Paaske | ..................... | G06F 21/85 |
| 2017/0085540 A1* | 3/2017 | Avanzi | .................. | H04L 9/0877 |
| 2019/0050601 A1* | 2/2019 | Zeh | ...................... | H04L 9/0822 |
| 2019/0220602 A1* | 7/2019 | Ruan | ..................... | G06F 21/575 |
| 2019/0349426 A1* | 11/2019 | Smith | ..................... | H04L 45/20 |
| 2020/0153625 A1* | 5/2020 | Schaap | .................. | H04L 9/0819 |
| 2020/0226952 A1* | 7/2020 | Lightowler | ........... | H04L 9/0643 |

OTHER PUBLICATIONS

Mcgrew, David A., et al., "The Galois/Counter Mode of Operation (GCM)," retrieved from <http://citeseerx.ist.psu.edu/viewdoc/download?doi=10.1.1.694.695&rep=rep1&type=pdf>, 43 pages.

* cited by examiner

CIRCUITS SUPPORTING IMPROVED SIDE CHANNEL AND FAULT INJECTION ATTACK RESISTANCE

TECHNICAL FIELD

The present disclosure relates to computer security, specifically detection and/or prevention of side-channel and fault injection attacks.

BACKGROUND

Stored data, particularly on multi-user systems such as cloud-based storage devices and network storage devices represents a significant vulnerability. Typically, such data is protected against unauthorized or surreptitious access through the use of cryptographic techniques. Such cryptographic techniques may include, for example, a NIST-compliant Advanced Encryption Standard (AES) cryptographic technique using a block size of 128 bits and a secret key having a length of 128 bits (AES-128), 192 bits (AES-192), or 256 bits (AES-256). Input data may then be transformed (or "wrapped") en-route to storage using the secret key. However, the presence of the secret key represents an exposure should the key be surreptitiously accessed or become available to an unauthorized or adversarial party.

Secret data, such as at least one secret key data value, may be gleaned indirectly through the use of a side channel attack (SCA) and/or a fault injection (FI) attack. SCAs gain information indirectly through a physical implementation rather than a direct crypto-analysis of the ciphered data. Typically, SCAs measure one or more system parameters such as timing (e.g., transformation/encryption time may vary depending on the value associated with key bits), power (e.g., system power profile may vary based upon the value associated with key bits), and/or emissions (e.g., electromagnetic energy emitted by the device may vary based upon values associated with key bits). Example power-based SCAs include simple power analysis (SPA); differential power analysis (DPA); correlation power analysis (CPA); or higher order differential power analysis (HODPA). FI attacks rely upon injecting faults and observing system performance using the resultant erroneous output. Example fault injection attacks include generating a voltage spike by varying the system supply voltage; generating a frequency glitch by varying the system clock frequency; causing a thermal/overtemperature event; and similar.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
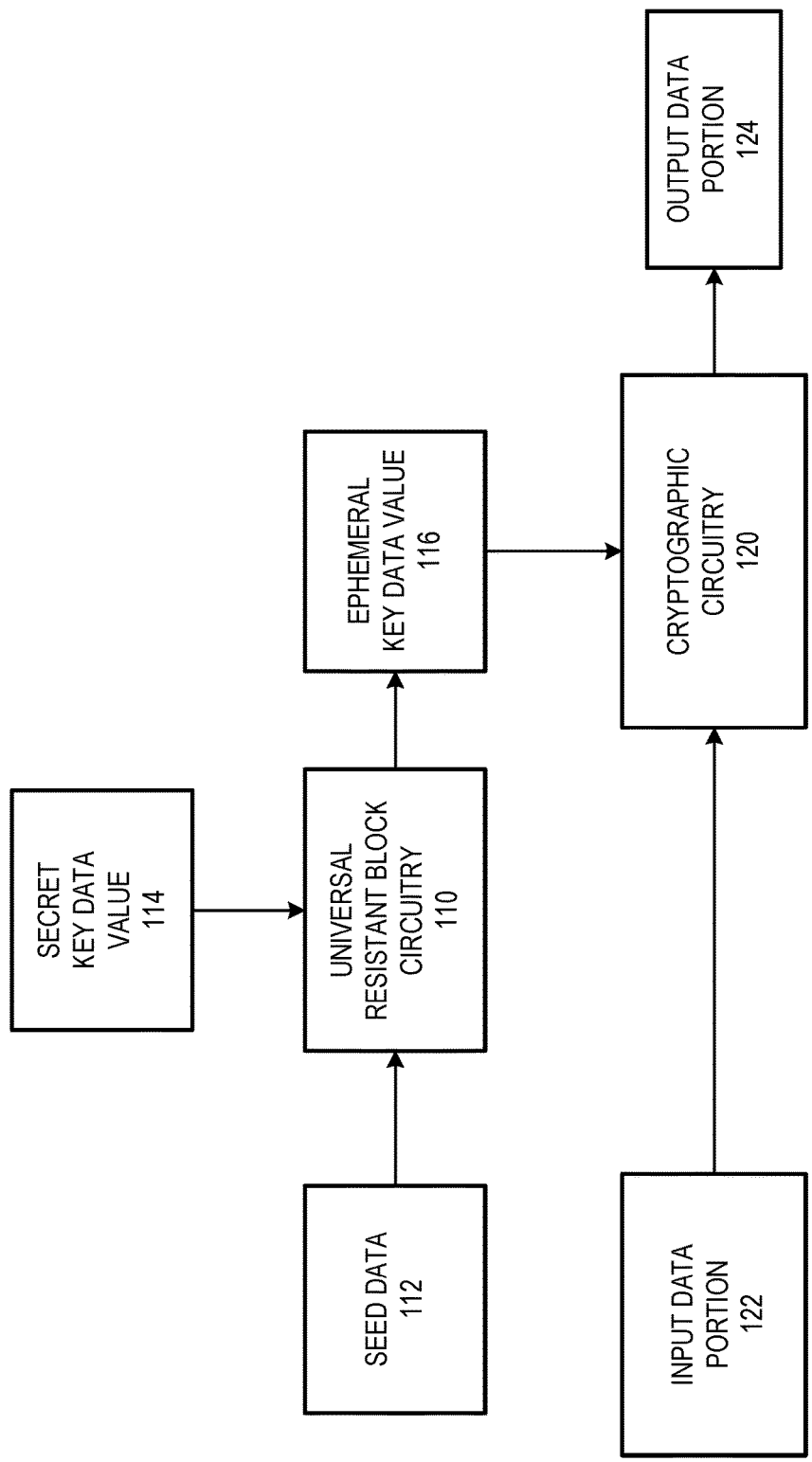
FIG. 1 provides a high level diagram of an illustrative system that includes Universal SCA/FI Resistant Block (URB) circuitry to receive seed data and at least one secret key data value, generate ephemeral key data, and cryptographic block circuitry that, using the generated ephemeral key data, transforms one or more input data portions to one or more output data portions, each of which does not include at least one secret key data value, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

With few exceptions, side-channel mitigation techniques focus on changing the implementation of a specific construction that is vulnerable to side-channel leakage. While this may be fine for new implementations of crypto primitives, it is extremely difficult to apply these methods to existing implementations. For example, consider the AES block cipher. The SubBytes step of the round function requires that each byte of the state be transformed into another byte via an affine transform of the multiplicative inverse of the byte value over $GF[2^8]$. Some implementations opt to use a simple table lookup. While such implementations are simple and performant, they are known to be vulnerable to cache-based side-channel attacks. Mitigation approaches include various masking schemes, compact S-box implementations, dedicated CPU instructions, numerous bit-slicing techniques, and others.

While such approaches may be effective and useful with new implementations of AES, using them on existing implementations is error-prone, and costly in engineering resources. In addition, such approaches provide little to no reuse benefit, as other cryptographic primitives and other side-channel vulnerabilities require their own unique mitigation schemes. In contrast, the proposed construction is a generalized approach. First, it can be utilized to mitigate different side-channel vulnerabilities across multiple cryptographic constructions—i.e. it has high reuse potential. Furthermore, it doesn't require changing existing implementations; thus being better suited to repairing existing implementations. This prevents defect injection, reduces dev/test time, and reduces maintenance complexity. The systems and methods disclosed herein beneficially address a long-standing problem in cryptographic implementations.

SCA and FI attacks are well known techniques for extracting high-value keys from cryptographic modules. Unfortunately, there is no general defense from such attacks—each module, and each change in design, technology or attack technique, has to be dealt with separately. In each case, that involves a very specialized design and review effort. Distressingly—defense may be impossible when a new attack technique is applied to existing hardware. Also, many architectures featuring an intrinsic SCA/FI resistant designs cause serious degradation in performance, increase in gate count, or both. The systems and methods disclosed herein beneficially provide a general construction featuring Universal SCA/FI Resistant Block (URB) circuitry to generate an ephemeral key that is supplied to cryptographic block (CB) circuitry. The use of the URB circuitry mitigates the likelihood of exposing at least one secret key data value in response to an SCA/FI attack while preserving the inherent cryptographic strength of the CB circuitry.

As used herein, the term "cryptographic block circuitry" and "CB circuitry" refers to any combination of electrical components, semiconductor devices, and/or logic elements capable of using key data to transform one or more input data values to an output data value that is a function of the key data and the input data value.

The systems and methods disclosed herein include URB circuitry to generate an ephemeral key using data representative of the secret key combined with seed data. The ephemeral key, rather than the secret key is then used by the CB circuitry to transform the received input data portion. In some implementations, the input data portion is apportioned into a plurality of sub-portions (e.g., data blocks) and a different ephemeral key data may be used to transform each of the plurality of input data sub-portions. In some implementations, common ephemeral key data may be used to transform some or all of the received input data portions. In either implementation, even should an SCA/FI attack on the cryptographic data block be successful, only the relatively low value ephemeral key is exposed rather than the high value secret key. The systems and methods disclosed herein thus provide numerous advantages:

The URB circuitry provides greater resistance SCA/FI attacks than the CB circuitry alone;

The use of separate URB circuitry and CB circuitry provides system designers with greater design freedom in the design of each;

The URB circuitry is applicable across a variety of systems and a variety of CB circuits;

A single URB circuit may service several CB circuits in a given chip design;

The robustness of the URB circuitry to SCA/FI attacks is independent of the secrecy of the algorithm implemented by the URB circuitry;

The use of the URB circuitry increases the statistical difficulty of a successful SCA/FI attack.

A data protection system is provided. The data protection system may include: universal resistant block (URB) circuitry that includes: input interface circuitry and output interface circuitry, the URB circuitry to: receive data representative of at least one seed data value via the input interface circuitry; receive at least one secret key data value via the input interface circuitry; generate at least one ephemeral key data value using the received at least one secret key data value and the at least one received seed data value; cryptographic circuitry that includes: input interface circuitry and output interface circuity, the cryptographic circuitry to: receive at least one input data portion via the cryptographic input interface circuitry; receive the at least one ephemeral key data value generated by the URB circuitry via the cryptographic input interface circuitry; and, for each received input data portion, generate a corresponding transformed output data portion using the respective input data portion and at least one of the one or more received ephemeral key data values.

A data protection method is provided. The method may include: receiving, by universal resistant block (URB) circuitry, data representative of at least one seed data value; receiving, by the URB circuitry, at least one secret key data value; generating, by the URB circuitry, at least one ephemeral key data value using the received at least one secret key data value and the at least one received seed data value; receiving, by cryptographic circuitry, at least one input data portion; receiving, by cryptographic circuitry, the at least one ephemeral key data value generated by the URB circuitry; and, for each received input data portion, generating, by the cryptographic circuitry, a corresponding transformed output data portion using the respective input data portion the at least one received ephemeral key data value.

A non-transitory storage device is provided. The non-transitory storage device may include instructions that, when executed by data protection circuitry, cause the data protection circuitry to: cause URB circuitry to generate at least one ephemeral key data value using at least one secret key data value and at least one received seed data value; and cause CB circuitry to generate, for each received input data portion, an output data portion using the respective input data portion and the at least one ephemeral key data value.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 provides a high level diagram of an illustrative system 100 that includes Universal SCA/FI Resistant Block (URB) circuitry 110 to receive seed data 112 and at least one secret key data value 114, generate one or more ephemeral key data values 116A-116n (collectively, "ephemeral key data values 116"), and provide the one or more ephemeral key data values 116 to cryptographic block (CB) circuitry 120 used to transform one or more input data portions 122A-122n (collectively, "input data portions 122") to provide a corresponding, output data portion 124A-124n (collectively, "output data portions 124") that does not include at least one secret key data value 114, in accordance with at least one embodiment described herein. In operation, the URB circuitry 110 receives and combines seed data 112 and the at least one secret key data value 114 to generate the one or more ephemeral key data values 116. The URB circuitry 110 communicates the one or more ephemeral key data values 116 to the CB circuitry 120. The CB circuitry 120 uses the received one or more ephemeral key data values 116 to wrap the input data 122 to provide the output data portion 124.

The URB circuitry 110 may include any number and/or combination of currently available and/or future developed electrical components, semiconductor devices, optical devices, and/or logic elements capable of generating an output that includes one or more ephemeral key data values 116 using a first input that includes seed data 112 and a second input that includes at least one secret key data value 114. In embodiments, the URB circuitry 110 may include one or more circuits that implement one or more algorithms to combine the seed data 112 and the at least one secret key data value 114 to provide one or more ephemeral key data values 116. The URB circuitry 110 includes one or more circuits resistant to side channel analysis attacks and/or fault insertion attacks.

In some embodiments, the seed data 112 provided to the URB circuitry 110 may include a randomly generated or pseudo-randomly generated data string having a length that includes any number of bits. In embodiments, the length of the seed data 112 may be based, in whole or in part, on the length of the input data portions 122. For example, the seed data 112 may have a length of: 16-bits or more; 32-bits or more; 64-bits or more; 128-bits or more; 192-bits or more; or 256-bits or more. In some embodiments, all or a portion of the input data portions 122 may be used to provide the seed data 112. For example, all or a portion of one or more of the input data portions 122 may form all or a portion of the seed data 112 provided to the URB circuitry 110. The at least one secret key data value 114 provided to the URB circuitry 110 may include a secret value or secret data string that is provided by the host system. For example, the at least one secret key data value 114 may include a data string representative of one or more unique values assigned by the host system manufacturer to and/or associated with a trusted execution environment (TEE) circuitry or similar secure storage, control, and/or processor circuitry disposed in, on, or about the host system.

The URB circuitry 110 generates the one or more ephemeral key data values 116 using all or a portion of the received seed data 112 and all or a portion of the received at least one secret key data value 114. The one or more ephemeral key data values 116 may include a data string having a length that includes any number of bits. For example, the URB circuitry 110 may generate: one or more 64-bit ephemeral key data values; one or more 128-bit ephemeral key data values; one or more 192-bit ephemeral key data values; or one or more 256-bit ephemeral key data values. In some embodiments, the URB circuitry 110 may generate a plurality of unique ephemeral key data values 116A-116n for each respective one of a corresponding plurality of input data portions 122A-122n. In other embodiments, the URB circuitry 110 may generate an ephemeral key data value 116 used by the CB circuitry 120 to transform some or all of a plurality of input data portions 122A-122n.

The CB circuitry 120 may include any number and/or combination of currently available and/or future developed electrical components, semiconductor devices, optical devices, and/or logic elements capable of transforming each received input data portion 122 using ephemeral key data 116 received from the URB circuitry 110 to generate an output data portion 124. In embodiments, the CB circuitry 120 may employ one or more National Institute of Science and Technology (NIST) standard encryption algorithms, techniques, and/or processes to transform the input data 122 using the one or more ephemeral key data values 116 generated by the URB circuitry 110. For example, the CB circuitry 120 may include one or more systems and/or circuits capable of transforming the input data portion 122 using any currently available or future developed block cipher algorithm such as: the Triple Data Encryption Algorithm (TDEA) using 64-bit input data 122 or the Advanced Encryption Standard (AES) using 128-bit input data 122. In another example, the CB circuitry 120 may include one or more systems and/or circuits capable of transforming some or all of the input data portions 122A-122n using any currently available or future developed stream cipher algorithm such as: Trivium, CryptMT, Salsa20, Py, and similar. The input data portion 122 may have any length. For example, the input data portion 122 may have a length of: 64-bits or more; 128-bits or more; 192-bits or more; or 256-bits or more.

Figure 2A:
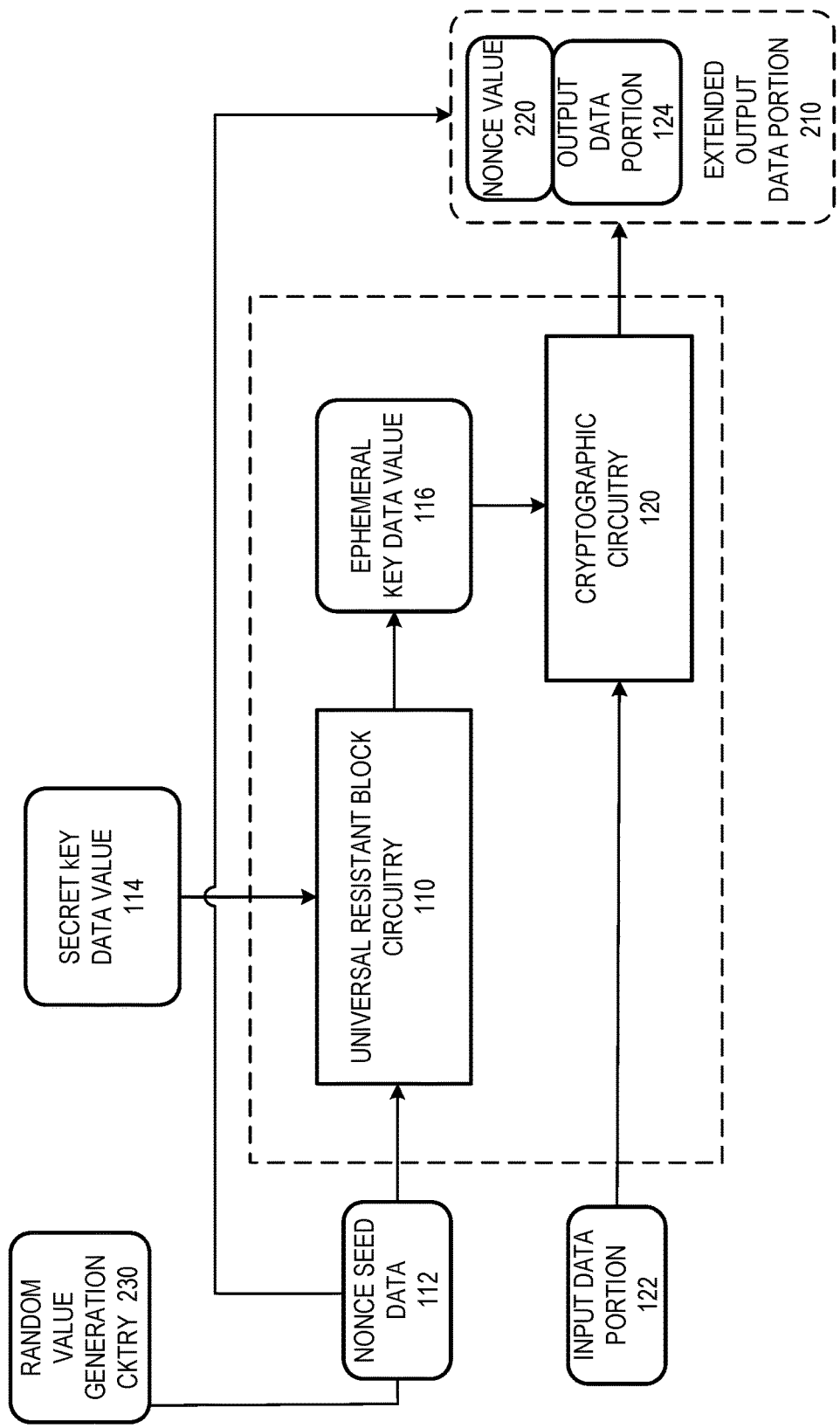
FIG. 2A is a block diagram of an illustrative system in which a nonce value or similar random or pseudo-random seed data is provided to the URB circuitry along with the at least one secret key data value to generate the ephemeral key data used to transform one or more input data portions to provide one or more extended output that includes the output data portion and a nonce value, in accordance with one or more embodiments described herein.
Figure 2B:
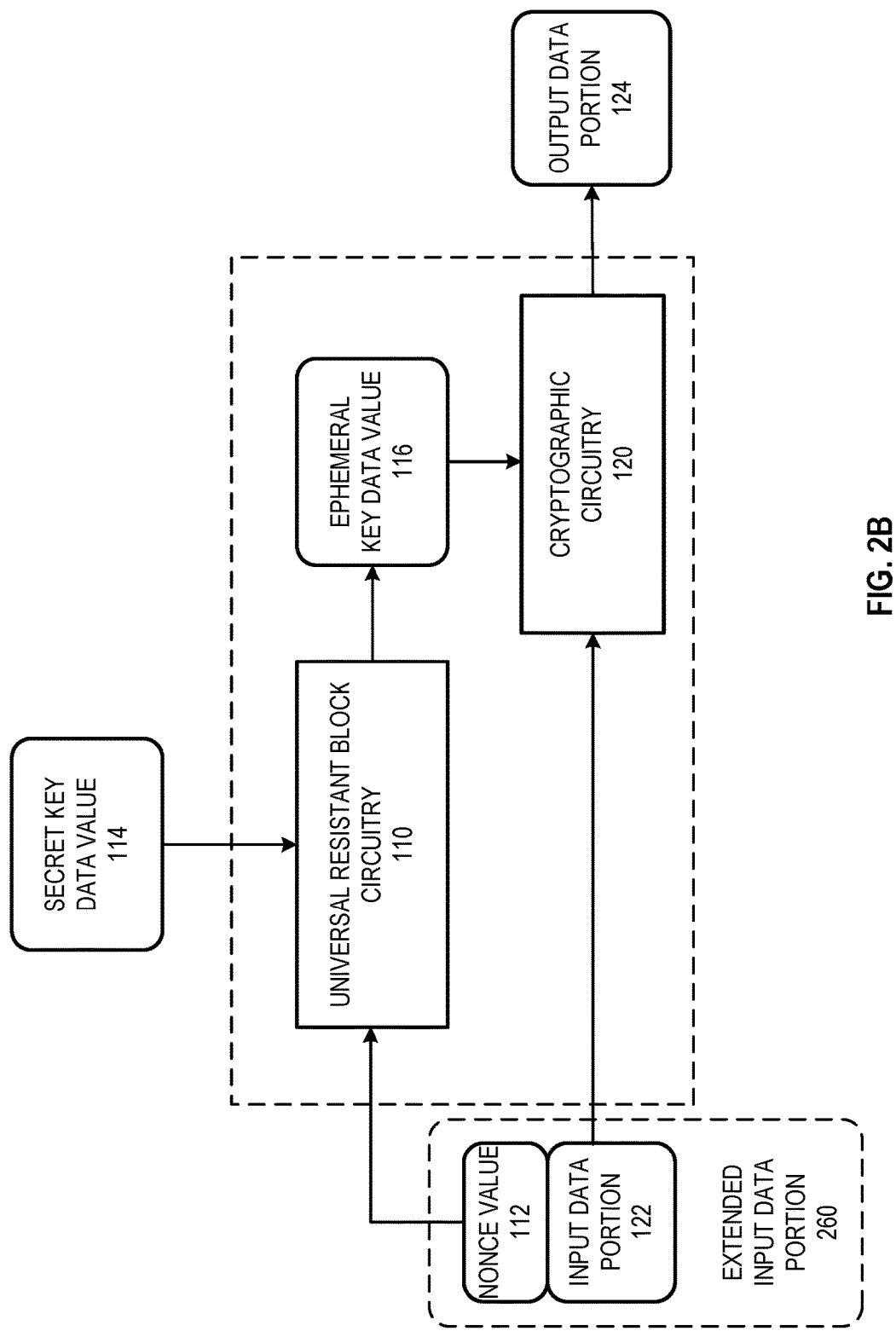
FIG. 2B is a block diagram of an illustrative system 200B that receives an extended input data portion 260 that includes data representative of a nonce value 112 and an input data portion 122 and transforms the extended input data portion 260 to provide an output data portion 124, in accordance with at least one embodiment described herein.

FIG. 2A is a block diagram of an illustrative system 200A in which a nonce or similar random or pseudo-random seed data 112 is provided to the URB circuitry 110 along with the at least one secret key data value 114 to generate the one or more ephemeral key data values 116 used to transform some or all of the input data portions 122A-122n to provide corresponding output portions 210A-210n that includes data representative of both the output data portion 124 and a nonce value 220 used to generate the ephemeral key data value 116 used by the CB circuitry 120 generate the output data portion 124, in accordance with one or more embodiments described herein. FIG. 2B is a block diagram of an illustrative system 200B that receives an extended input data portion 260 that includes data representative of a nonce value 112 and an input data portion 122 and transforms the extended input data portion 260 to provide an output data portion 124, in accordance with at least one embodiment described herein.

As depicted in FIG. 2A, the seed data 112 may include one or more randomly generated or pseudo-randomly generated nonce values. The nonce value 112 may be generated, in some instances, by one or more systems or devices disposed at least partially in the host system. For example, random value generation circuitry 230 may provide the nonce value 112. The resultant extended output portion 210 includes the output data portion 124 and data representative of the nonce value 220 used by the URB circuitry 110 to generate the respective ephemeral key data value 116 used by the CB circuitry 120 to generate the extended output data portion 210.

As depicted in FIG. 2B, the system 200B including the URB circuitry 110 and the CB circuitry 120 may be used transform one or more extended input data portions 260, each of which includes a respective input data portion 122 and the nonce value 112 used to generate the respective extended input data portion 124, to a respective output data portion 124.

Figure 3:
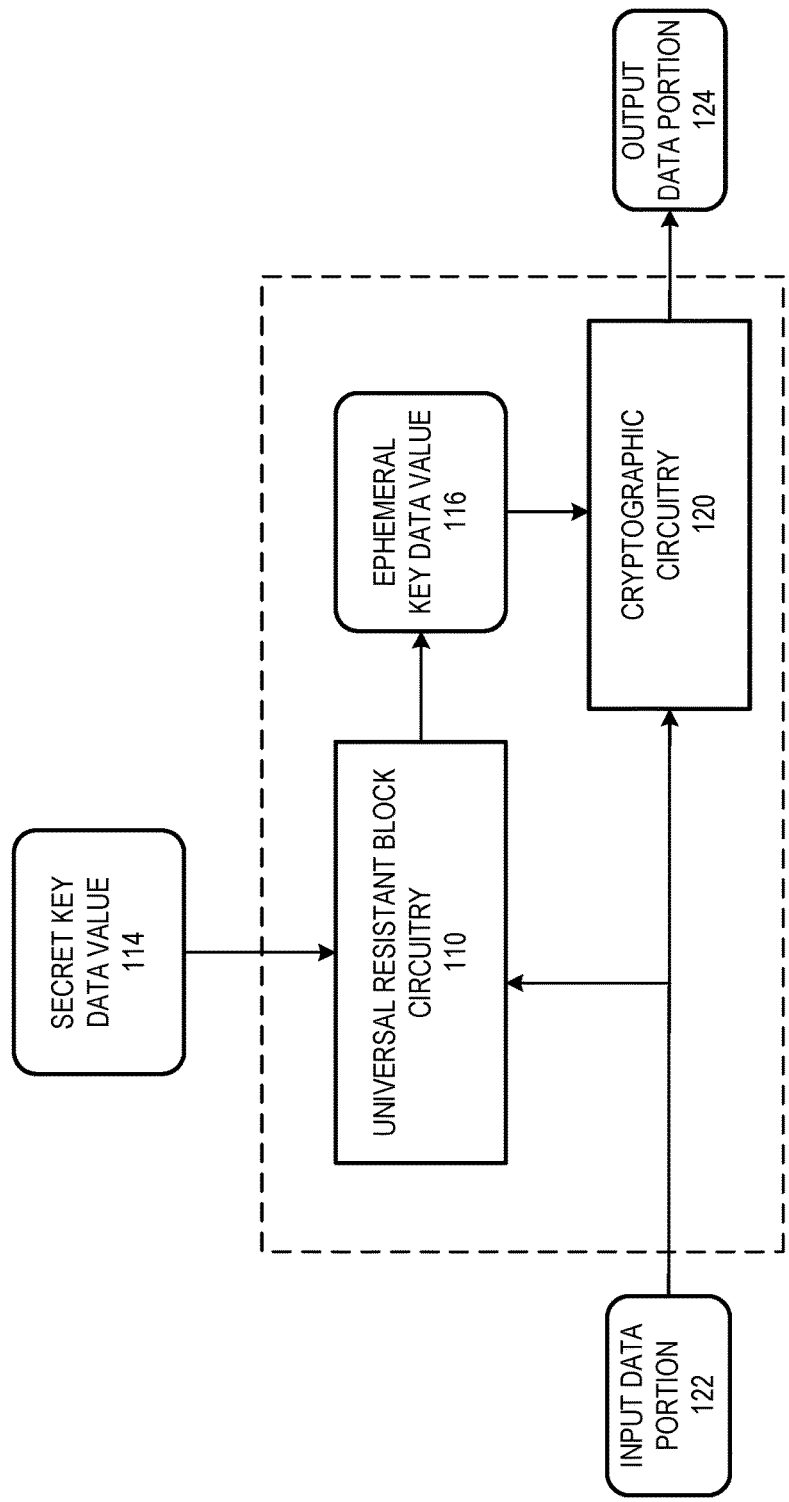
FIG. 3 is a block diagram of an illustrative system in which all or a portion of the input data portion is provided to the URB circuitry along with the at least one secret key data value to generate the ephemeral key data, in accordance with one or more embodiments described herein.

FIG. 3 is a block diagram of an illustrative system 300 in which all or a portion of the input data 122 is provided to the URB circuitry 110 along with the at least one secret key data value 114 to generate the one or more ephemeral key data values 116, in accordance with one or more embodiments described herein.

Figure 4:
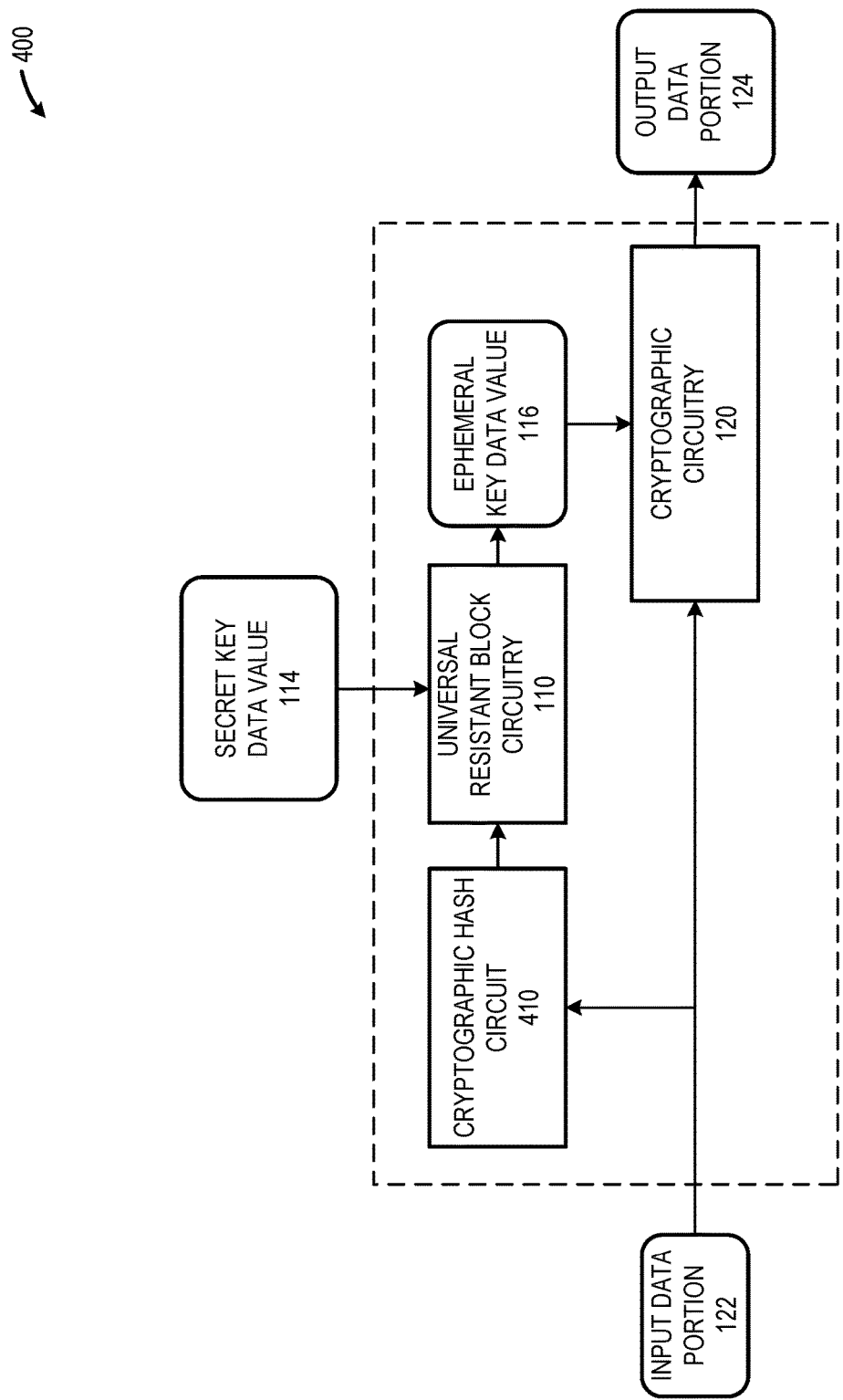
FIG. 4 is a block diagram of an illustrative system in which all or a portion of the input data portion is first passed through a cryptographic hash circuit before being provided to the URB circuitry along with the at least one secret key data value to generate the ephemeral key data, in accordance with one or more embodiments described herein.

FIG. 4 is a diagram of an illustrative system 400 in which all or a portion of the input data 122 is first passed through a cryptographic circuit 410 before being provided seed data 112 to the URB circuitry 110 along with the at least one secret key data value 114 to generate the one or more ephemeral key data values 116, in accordance with one or more embodiments described herein. The system 400 beneficially limits an adversary's access to the URB circuitry 110 since the seed input 112 is derived from some or all of one or more of the input data portions 122 using a cryptographic hash circuit 410.

Figure 5:
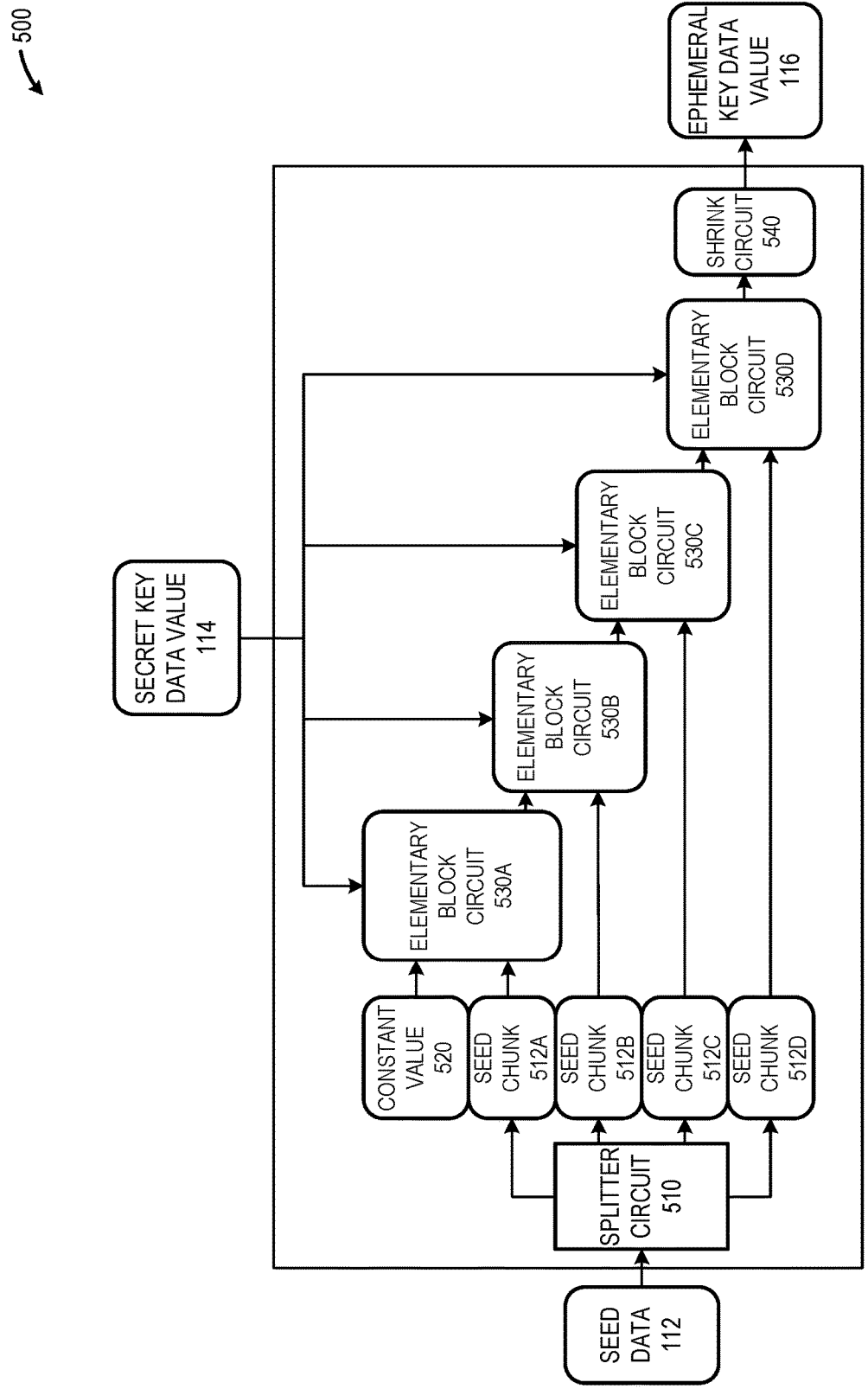
FIG. 5 is a schematic diagram depicting an example construction of an illustrative URB circuit, in accordance with one or more embodiments described herein.

FIG. 5 is a schematic diagram 500 depicting an example construction of illustrative URB circuitry 110, in accordance with one or more embodiments described herein. As depicted in FIG. 5, the URB circuitry 110 may include one or more splitter circuits 510 to equally or unequally apportion the seed data 112 into a plurality of seed data chunks 512A-512n (as depicted in FIG. 5, the seed data 112 has been apportioned into four seed data chunks 512A, 512B, 512C, and 512D). As depicted in FIG. 5, the at least one secret key data value 114 may include any number of bits (e.g., "S" bits), and each of the seed data chunks 512 may include any number of bits (e.g., "N" bits). The URB circuitry 110 includes a plurality of elementary block circuits 530A-530n (four such elementary block circuits 530A-530D are included in FIG. 5). In embodiments, each of the elementary block circuits 530A-530n receives the at least one secret key data value 114, a respective seed data chunk 512A-512n, and an output value from a prior elementary block circuit 510 that may contain any number of bits (e.g., "2S" bits) and to generate an output value having any number of bits (e.g., "2S" bits). In lieu of the output value from a prior elementary block circuit 510, the first elementary block circuit 510A may instead receive a constant value 520 that includes any number of bits similar in number to the number of bits generated as an output value by each of the elementary block circuits 510 (e.g., "2S" bits). The URB circuitry 110 also includes one or more shrink circuits 540 to receive the output generated by the final elementary block circuit 530 and reduce or "shrink" the output to a lesser number of bits used to provide the ephemeral key data 116. For example, the one or more shrink circuits 540 may bitwise XOR two halves of the input to reduce the output from a length of "2S" to a length of "S."

In embodiments, each seed data chunk 512A-512n may have a length ("N") of: 64-bits or more; 128-bits or more; 192-bits or more; or 256-bits or more. In embodiments, the at least one secret key data value 114 may have a length ("S") that is: 2× or more the length of the seed data chunk 512; 3× or more the length of the seed data chunk 512; 4× or more the length of the seed data chunk 512; or 8× or more the length of the seed data chunk 512. Thus, the at least one secret key data value 114 may have a length ("S") of: 128-bits or more; 256-bits or more; 512-bits or more; 1024-bits or more; or 2048-bits or more.

Figure 6:
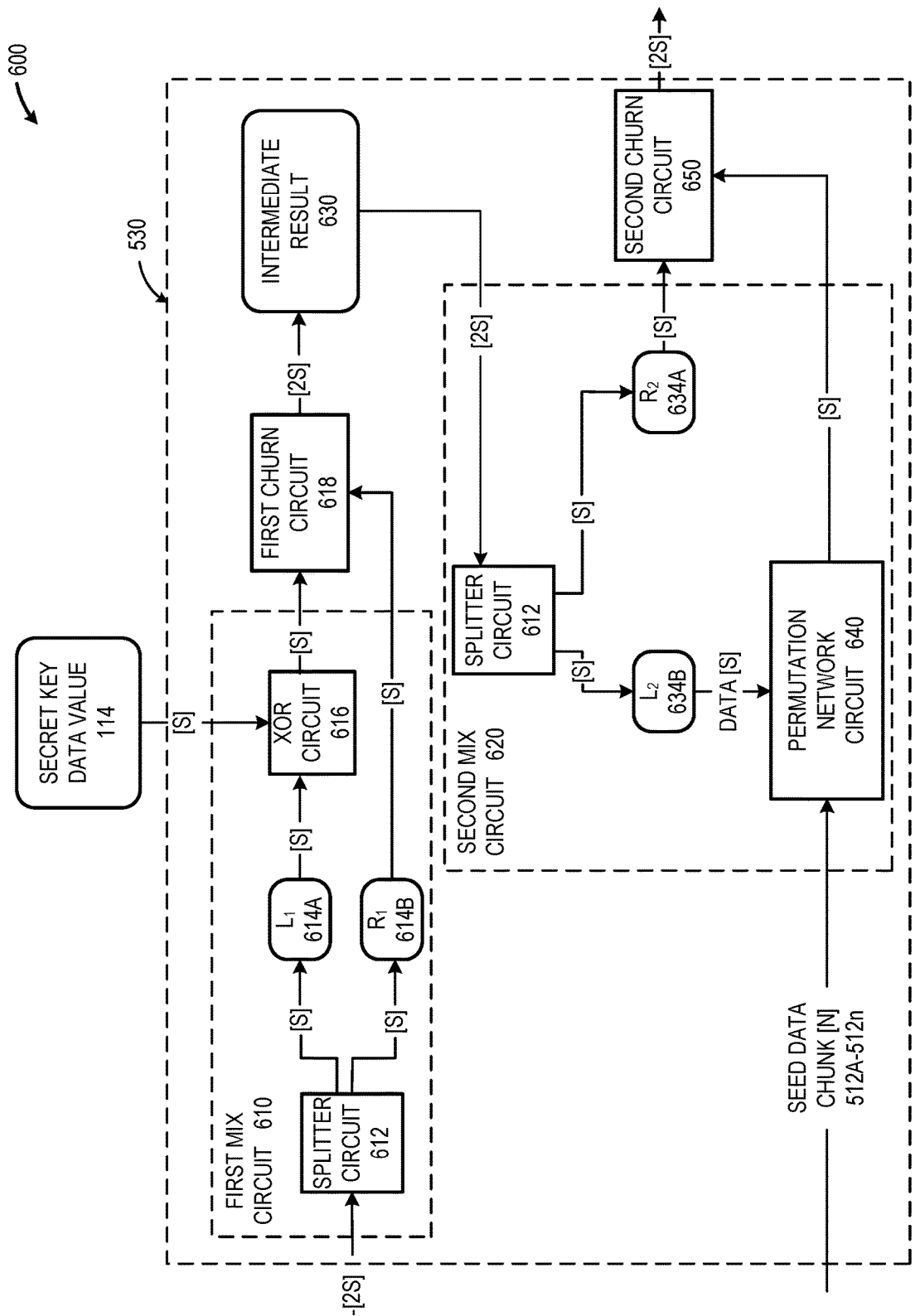
FIG. 6 is a block diagram of an illustrative elementary block circuit that includes a first mixing circuit to mix the at least one secret key data value with the output from a prior elementary block circuit to provide an intermediate result and a second mixing circuit to mix the intermediate result with a seed data chunk, in accordance with one or more embodiments described herein.

FIG. 6 is a block diagram 600 of an illustrative elementary block circuit 530 that includes a first mix circuit 610 to combine the at least one secret key data value 114 with the output from a prior elementary block circuit 530 to provide an intermediate result 630 and a second mix circuit 620 to combine the intermediate result with a seed data chunk 512, in accordance with one or more embodiments described herein. As depicted in the illustrative embodiment in FIG. 6, the first mix circuit 610 includes a splitter circuit 612 that apportions the "2S" bits received from the prior elementary block circuit 530 into a first portion 614A containing "S" bits and a second portion 614B containing "S" bits. An XOR circuit 616 combines the first portion 614A ("S" bits) with the at least one secret key data value 114 ("S" bits). A first churn circuit 618 churns the second portion 614B ("S" bits) with the combined first portion 614A ("S" bits) and at least one secret key data value 114 to generate an intermediate result 630 ("2S" bits).

The intermediate result 630 is provided to the second mix circuit 620. In embodiments, a second splitter circuit 632 disposed in the second mix circuit 620 may be used to apportion the intermediate result 630 into a plurality of equal or unequal sized portions. For example, the second splitter circuit 632 may apportion the intermediate result 630 into a first portion 634A containing "S" bits and a second portion 634B containing "S" bits. A permutation network circuit 640 combines the second portion 634B with the seed data chunk 512 ("N" bits) to provide an output containing "S" bits. A second churn circuit 650 combines the first portion 634A with the output generated by the permutation network circuit 640 to provide the elementary block output ("2S" bits). As depicted in the illustrative embodiment in FIG. 6, the first churn circuit 618 and/or the second churn circuit 650 preferably implement invertible logic functions. In embodiments, each bit of the output provided by the first churn circuit 618 and/or the second churn circuit 650 depends on some or all of the bits included in the input provided to the first churn circuit 618 and/or the second churn circuit 650. In embodiments, each bit of the output provided by the permutation network circuit 640 depends on some or all of the bits included in the seed data chunk 512A-512n and some or all of the bits included in the second portion 634B of the intermediate result 630 provided by the second splitter circuit 632.

Figure 7:
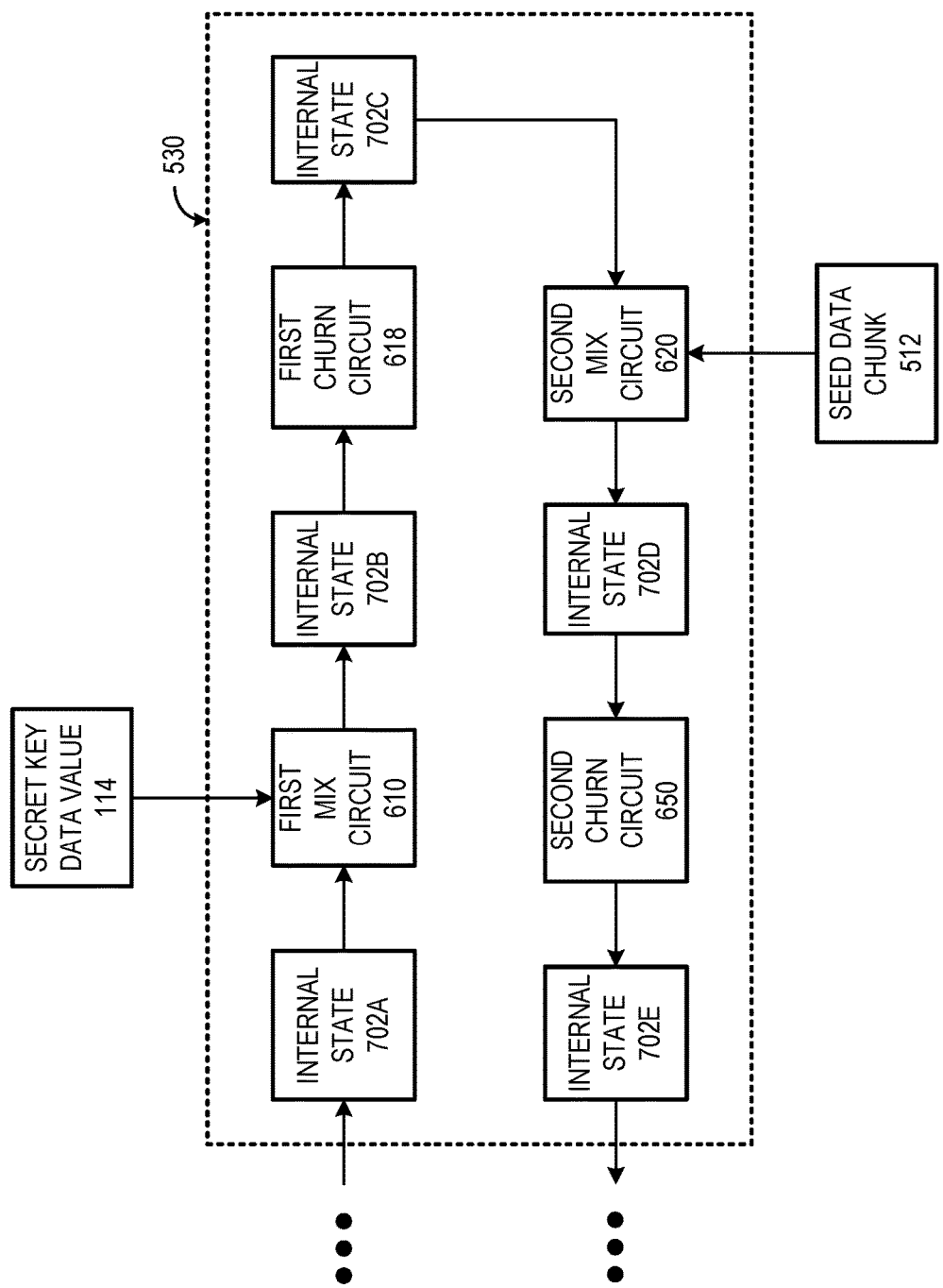
FIG. 7 is a block diagram that depicts an illustrative high-level, functional, internal arrangement of example elementary block, in accordance with at least one embodiment described herein.

FIG. 7 is a block diagram 700 that depicts an illustrative high-level, functional, internal arrangement of example elementary block 530, in accordance with at least one embodiment described herein. As depicted in FIG. 7, the elementary block 530 may include a first mixing circuit portion 610 to combine all or a portion of one or more of the seed data portions 512A-512n with data representative of the mixing system internal state 702A to produce a modified output internal state 702B. In embodiments, the first mix circuit 610 may combine at least a portion of one or more seed data chunks 512A-512n with data representative of the mixing system internal state. In embodiments, the mixing system may incorporate, include, or otherwise provide data representative of a relatively large internal state such that the alteration of the mixing system internal state caused by combining the seed data 512A-512n with the data representative of the mixing system internal state affects only a relatively small portion of the mixing system internal state. The first churn circuit 618 separates and/or isolates the first mix circuit 610 that receives the seed data 112 from a second mix circuit 620 that receives the at least one secret key data value 114. Thus, the first churn circuit 618 beneficially minimizes, mitigates, or precludes direct access to the at least one secret key data value 114 received by the first mix circuit 610 thereby increasing the difficulty of an SCA attack which typically depends upon exploiting the interaction between a known input and a key. Each input bit provided by the mixing system internal state 702B to the first mix circuit 610 affects the entire mixing system internal state 702C. In embodiments, supplying different seed data chunks 512A-512n to the first mix circuit 610 produces a different internal state 702B in the missing system 600.

In embodiments, the second mix circuit 620 may combine the seed data chunks 512A-512n with data representative of the internal state 702 of the mixing system 600. In embodiments, the second mix circuit 620 combines the entirety of the at least one secret key data value 114 with the data representative of the mixing system internal state 702. A second churn circuit 650 separates and/or isolates the second mix circuit 620 from the output of the URB circuitry 110. Similar to the first churn circuit 618, each input bit provided by the mixing system internal state 702D to the second churn circuit 650 affects the internal state 702E of the mixing system 600. In embodiments, the second mix circuit 620 may linearly combine the seed data chunks 512A-512n with the internal state 702 of the mixing system 600, for example using a bitwise exclusive OR ("XOR") functions in the second mix circuit 620.

Figure 8:
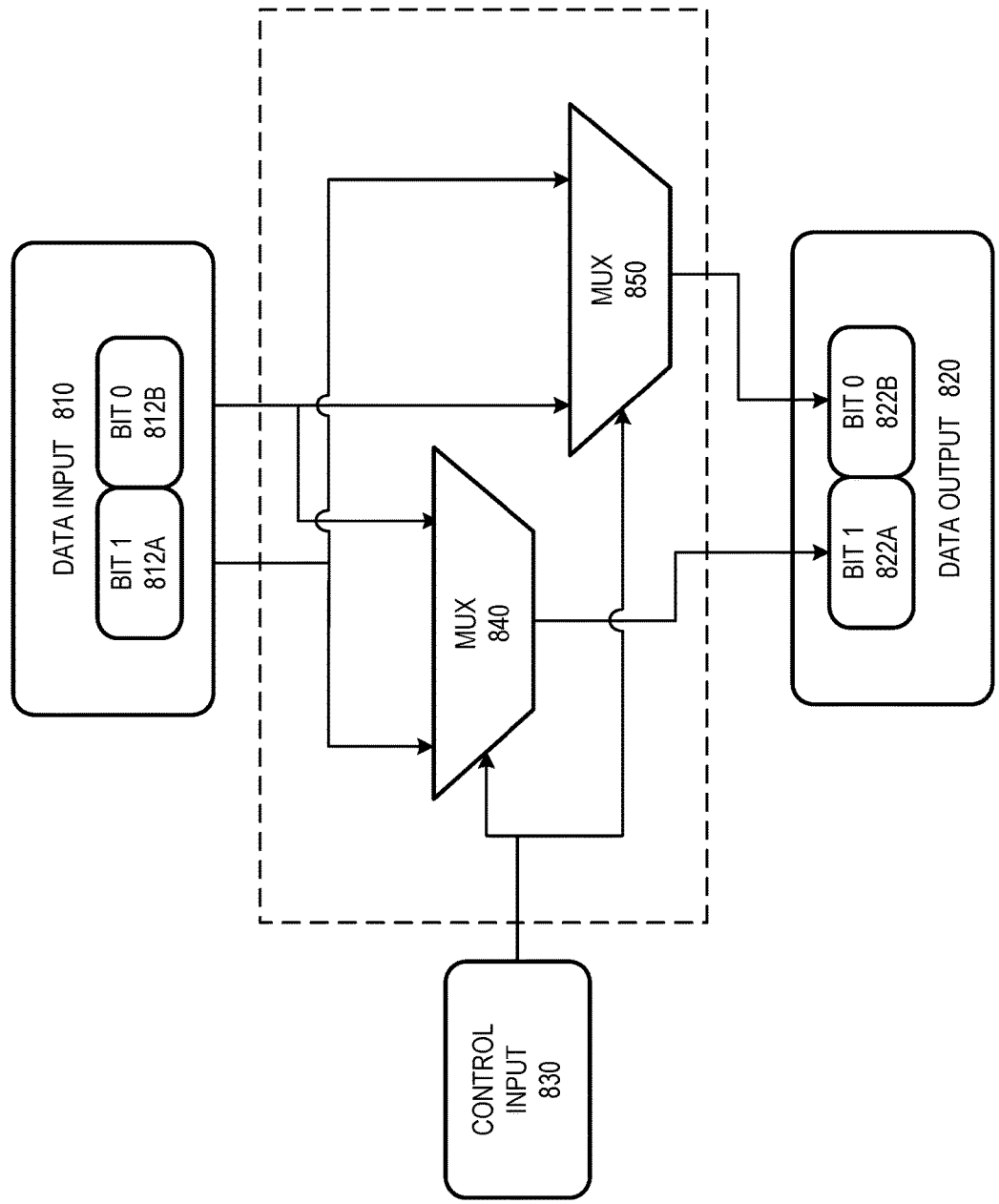
FIG. 8 is a schematic diagram of an illustrative permutation cell circuit used to implement a permutation network circuit, such as the permutation network circuit depicted in FIG. 7, in accordance with one or more embodiments described herein.

FIG. 8 is a schematic diagram of one of a plurality of illustrative permutation cell circuits 800 used to implement a permutation network circuit 640, such as the permutation network circuit 640 depicted in FIG. 6, in accordance with one or more embodiments described herein. In embodiments, the data input 810 to a permutation cell 800 is received from either from the splitter circuit 612 or from the output 820 of other permutation cells 800, and the output 820 generated by the permutation cell 800 is communicated as either: input data 810 to another, subsequent, permutation cell 800; or to the second churn circuit 650. In embodiments, the permutation cell circuit 800 receives a data input 810 and generates a data output 820. As depicted in FIG. 8, the data input 810 may include a plurality of bits, such as bits 812A and 812B and the data output 820 may include a plurality of bits, such as bits 822A and 822B. In embodiments, the second portion 634B may provide one or more of the bits included in the data input 810. In embodiments, the data output 820 from one or more permutation cell circuits 800 may provide one or more of the bits included in the data input 810. In embodiments, the data output 820A-820n generated by each respective one of all or a portion of a plurality of permutation cell circuits 800A-800n may be combined to provide the output from the permutation network circuit 640 supplied to the second churn circuit 650. In embodiments, the data output 820A-820n generated by each respective one of all or a portion of the plurality of permutation cell circuits 800A-800n may provide the data input 810 to at least one other permutation cell circuit 800.

The permutation cell circuit 800 also receives a control input 830. In embodiments, the control input 830 provided to each permutation cell circuit 800 includes at least one of the bits included in the seed data chunk 512 provided to the host permutation network circuit 640. Thus, for example, a single bits from associated with a seed data chunk 512 containing "N" bits may be distributed as respective control inputs 830A-830N to each of a plurality of permutation cell circuits 800A-800N forming the permutation network circuit 640.

Figure 9:
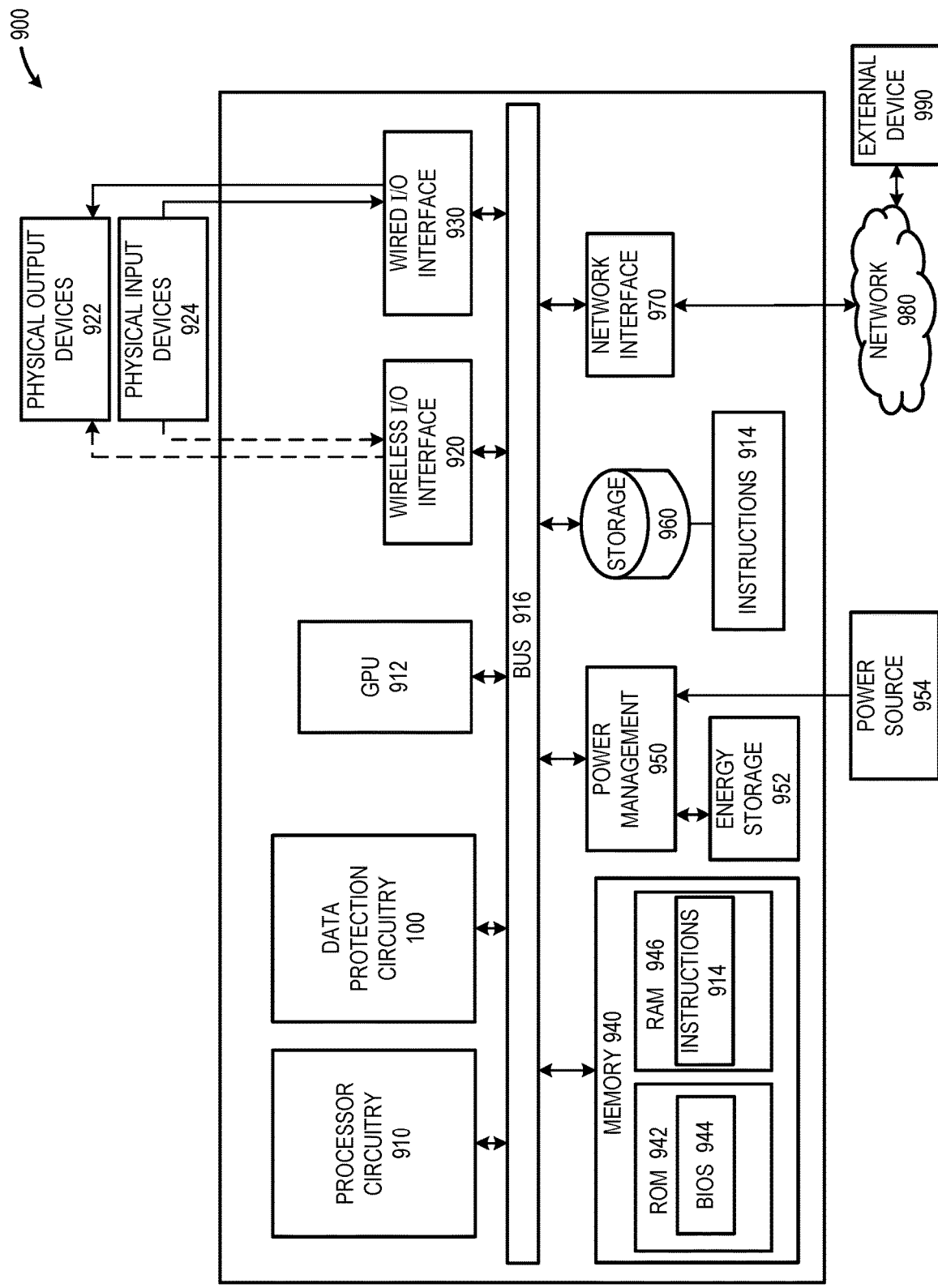
FIG. 9 is a schematic diagram of an illustrative electronic, processor-based, device that includes processor circuitry and data protection circuitry that includes URB circuitry and cryptographic circuitry, in accordance with at least one embodiment described herein.

FIG. 9 is a schematic diagram of an illustrative electronic, processor-based, device 900 that includes processor circuitry 910 and data protection circuitry 100 that includes URB circuitry 110 and cryptographic circuitry 120, in accordance with at least one embodiment described herein. The processor-based device 900 may additionally include one or more of the following: a graphical processing unit 912, a wireless input/output (I/O) interface 920, a wired VO interface 930, system memory 940, power management circuitry 950, a non-transitory storage device 960, and a network interface 970. The following discussion provides a brief, general description of the components forming the illustrative processor-based device 900. Example, non-limiting processor-based devices 900 may include, but are not limited to: smartphones, wearable computers, portable computing devices, handheld computing devices, desktop computing devices, blade server devices, workstations, and similar.

The processor-based device 900 includes processor circuitry 910 and data protection circuitry 100. In operation, the data protection circuitry 100 receives, as inputs, at least one secret key data value 114 associated with the processor-based device 900 and a plurality of input data portions 122A-122n. The data protection circuitry 100 receives or internally generates a seed data value 112 that is used by the URB circuitry 110 to generate the one or more ephemeral key data values 116. The one or more ephemeral key data values 116 may be used by the CB circuitry 120 to generate a corresponding plurality of output data portions 124A-124n. In embodiments, a different ephemeral key data value 114A-114n may be generated for each respective one of the plurality of input data portions 122A-122n. In other embodiments, a single ephemeral key data value 114 may be used to transform two or more of the plurality of input data portions 122A-122n. The ephemeral key data value 116 obfuscates the at least one secret key data value such that even should an attacker surreptitiously obtain the at least one ephemeral key data value 116 used by the CB circuitry 120 to generate the output data portion 124, the at least one secret key data value 114 remains protected. In addition, since a different ephemeral key data value 114A-114n may be used to transform each of a plurality of input data portions 122A-122n, an attacker is unable to use SCA and/or fault injection attacks to piecemeal uncover the ephemeral key data value 114 and must instead discover the entire ephemeral key data value 114 for each of the output data portions 124A-124n.

In some embodiments, the processor-based device 900 includes graphics processor circuitry 912 capable of executing machine-readable instruction sets 914 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 910 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 900 includes a bus or similar communications link 916 that communicably couples and facilitates the exchange of information and/or data between various system components including the processor circuitry 910, the graphics processor circuitry 912, one or more wireless I/O interfaces 920, one or more wired I/O interfaces 930, the system memory 940, one or more storage devices 960, and/or one or more network interfaces 970. The processor-based device 900 may be referred to in the singular herein, but this is not intended to limit the embodiments to a single processor-based device 900, since in certain embodiments, there may be more than one processor-based device 900 that incorporates, includes, or contains any number of communicably coupled, collocated, or remote networked circuits or devices.

The processor circuitry 910 may include any number, type, or combination of currently available or future developed devices capable of executing machine-readable instruction sets. The processor circuitry 910 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 9 are of conventional design. Consequently, such blocks need not be described in further detail herein, as they will be understood by those skilled in the relevant art. The bus 916 that interconnects at least some of the components of the processor-based device 900 may employ any currently available or future developed serial or parallel bus structures or architectures.

The system memory 940 may include read-only memory ("ROM") 942 and random access memory ("RAM") 946. A portion of the ROM 942 may be used to store or otherwise retain a basic input/output system ("BIOS") 944. The BIOS 944 provides basic functionality to the processor-based device 900, for example by causing the processor circuitry 910 to load and/or execute one or more machine-readable instruction sets 914. In embodiments, at least some of the one or more machine-readable instruction sets 914 cause at least a portion of the processor circuitry 910 to provide, create, produce, transition, and/or function as a dedicated, specific, and particular machine, for example a word processing machine, a digital image acquisition machine, a media playing machine, a gaming system, a communications device, a smartphone, or similar.

The processor-based device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 924 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The processor-based device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include but are not limited to: universal serial bus (USB), IEEE 1394 ("FireWire"), and similar.

The processor-based device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the processor-based device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor circuitry 910 and/or graphics processor circuitry 912 and/or one or more applications executed on or by the processor circuitry 910 and/or graphics processor circuitry 912. In some instances, one or more data storage devices 960 may be communicably coupled to the processor circuitry 910, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or WiFi®, etc.).

Machine-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor circuitry 910 and/or graphics processor circuitry 912.

The processor-based device 900 may include power management circuitry 950 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the processor-based device 900. The power source 954 may include, but is not limited to, a solar power system, a commercial electric grid, a portable generator, an external energy storage device, or any combination thereof.

For convenience, the processor circuitry 910, the graphics processor circuitry 912, the wireless I/O interface 920, the wired I/O interface 930, the system memory 940, the power management circuitry 950, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 9. For example, one or more of the above-described components may be directly coupled to other components, or may be coupled to each other, via one or more intermediary components (not shown). In another example, one or more of the above-described components may be integrated into the processor circuitry 910 and/or the graphics processor circuitry 912. In some embodiments, all or a portion of the bus 916 may be omitted and the components are coupled directly to each other using suitable wired or wireless connections.

Figure 10:
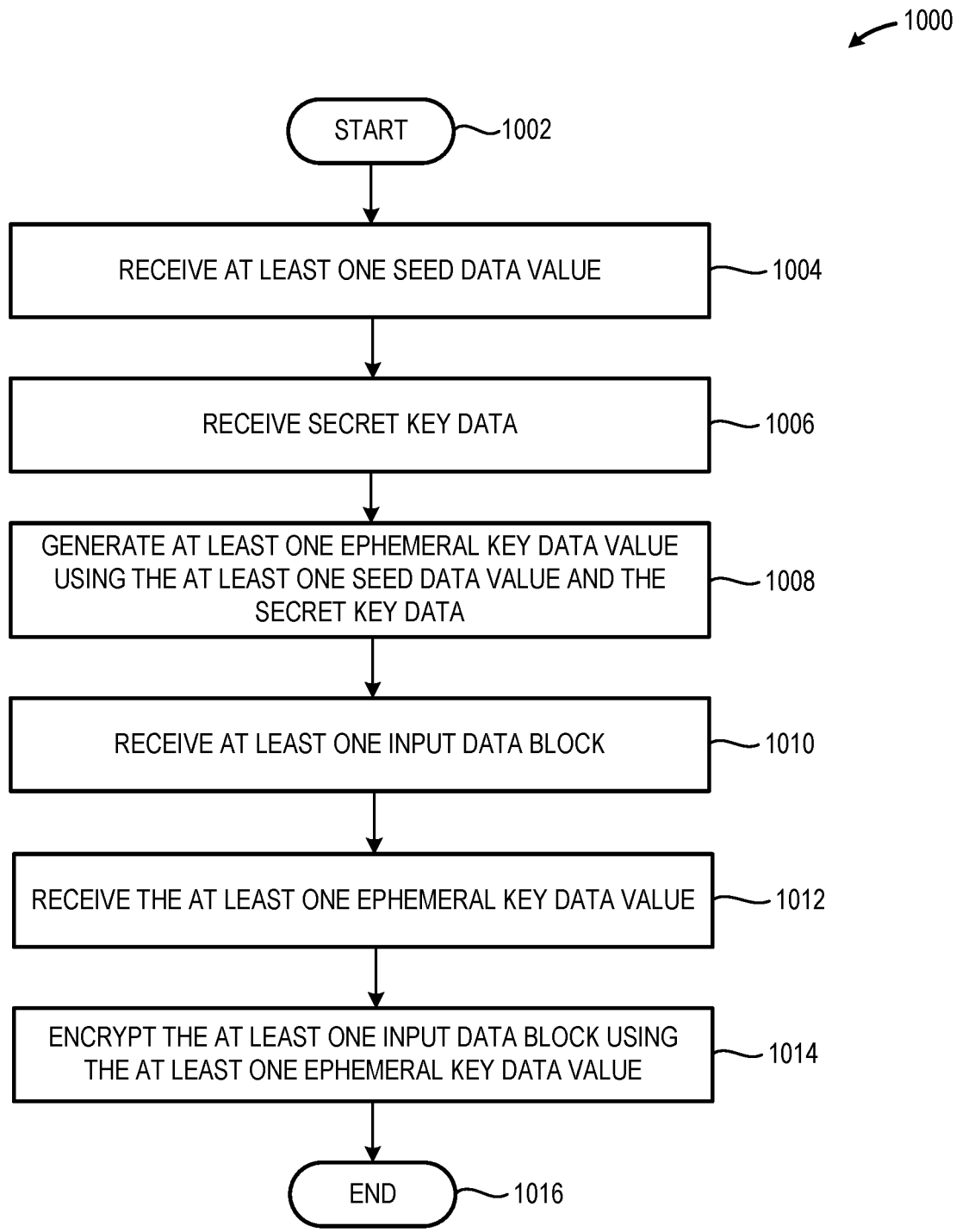
FIG. 10 is a high-level flow diagram of an illustrative method of protecting data from SCA and fault injection attacks by generating an ephemeral key data value and wrapping each input data portion using the ephemeral key data value, in accordance with at least one embodiment described herein.

FIG. 10 is a high-level flow diagram of an illustrative method 1000 of protecting data from SCA and fault injection attacks by generating an ephemeral key data value 116 and wrapping each input data portion 122A-122n using the ephemeral key data value 116, in accordance with at least one embodiment described herein. The method 1000 commences at 1002.

At 1004, the URB circuitry 110 receives one or more seed data values 112A-112n. In embodiments, each of the seed data values 112 may include a data string having a length of: 64-bits or more; 128-bits or more; 192-bits or more; or 256-bits or more. In embodiments, each of the one or more seed data values 112 may include a randomly generated data value. In embodiments, each of the one or more seed data values 112 may include a pseudo-randomly generated data value. In embodiments, each of the one or more seed data values 112 may include a portion of at least one of the input data portions 122. In embodiments, each of the one or more seed data values 112 may include a hashed portion of at least one of the input data portions 122.

At 1006, the URB circuitry 110 receives a at least one secret key data value 114.

At 1008, the URB circuitry 110 generates one or more ephemeral key data values 116A-116n using the received one or more seed data values 112A-112n and the received at least one secret key data value 114. In embodiments, the URB circuitry 110 may generate a unique ephemeral key data value 116 for each respective one of the received input data portions 122A-122n. In embodiments, the URB circuitry 110 may generate a unique ephemeral key data value 116 used to transform two or more received input data portions 122. In embodiments, the URB circuitry 110 may generate a unique ephemeral key data value 116 used to transform all of the received input data portions 122A-122n.

At 1010, the cryptographic circuitry 120 receives each of a plurality of input data portions 122A-122n. Each of the plurality of input data portions 122A-122n may have a length of: 64-bits or more; 128-bits or more; 192-bits or more; or 256-bits or more.

At 1012, the cryptographic circuitry 120 receives each of the one or more ephemeral key data values 116A-116n from the URB circuitry 110.

At 1014, the cryptographic circuitry 120 transforms each of the plurality of input data portions 122A-122n using an ephemeral key data value 116. In embodiments, the cryptographic circuitry 120 may transform each of the received input data portions 122A-122n using a respective one of a plurality of ephemeral key data values 116A-116n. In embodiments, the cryptographic circuitry 120 may transform two or more of the received input data portions 122A-122n using a single ephemeral key data value 116. In embodiments, the cryptographic circuitry 120 may transform all of the received input data portions 122A-122n using a single ephemeral key data value 116. The method 1000 concludes at 1016.

While FIG. 10 illustrates various operations according to one or more embodiments, it is to be understood that not all of the operations depicted in FIG. 10 are necessary for other embodiments. Indeed, it is fully contemplated herein that in other embodiments of the present disclosure, the operations depicted in FIG. 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods to protect against SCA and fault injection attacks through the use of a temporary or ephemeral key to cryptographically alter input data portions. Universal resistant block (URB) circuitry receives a seed data value and a at least one secret key data value and generates an ephemeral key output data value. Cryptographic circuitry uses the ephemeral key data value to transform an input data portion to produce an transformed output data portion. The use of an SCA or fault injection attack on the transformed output data portion will reveal only the ephemeral key data value and not the at least one secret key data value. Further, where a unique ephemeral key data value is used to transform each input data portion, an attacker cannot discover the ephemeral key in a piecemeal manner and must instead discover the complete ephemeral key data value—significantly increasing the difficulty of performing a successful SCA or fault injection attack.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for protecting against SCA and fault injection attacks through the use of a temporary or ephemeral key to cryptographically alter input data portions.

According to example 1, there is provided a data protection system. The data protection system may include: universal resistant block (URB) circuitry that includes: input interface circuitry and output interface circuitry, the URB circuitry to: receive data representative of at least one seed data value via the input interface circuitry; receive at least one secret key data value via the input interface circuitry; generate at least one ephemeral key data value using the received at least one secret key data value and the at least one received seed data value; cryptographic circuitry that includes: input interface circuitry and output interface circuity, the cryptographic circuitry to: receive at least one input data portion via the cryptographic input interface circuitry; receive the at least one ephemeral key data value generated by the URB circuitry via the cryptographic input interface circuitry; and, for each received input data portion, generate a corresponding transformed output data portion using the respective input data portion and at least one of the one or more received ephemeral key data values.

Example 2 may include elements of example 1 where the at least one seed data value comprises a plurality of seed data values; where the at least one ephemeral key data value comprises a plurality of ephemeral key data values; where the URB circuitry to generate each of the plurality of ephemeral key data values using the received at least one secret key data value and a respective one of the seed data values; where the at least one input data portion comprises a plurality of input data portions; and where the cryptographic circuitry to transform each of the plurality of input data portions using a respective one of the plurality of ephemeral key data values.

Example 3 may include elements of any of examples 1 or 2 where the at least one input data portion comprises a plurality of input data portions; and where the cryptographic circuitry to generate, for each of at least two of the plurality of input data portions, at least two respective corresponding transformed output data portions using the respective at least two input data portions and one of the plurality of ephemeral key data values.

Example 4 may include elements of any of examples 1 through 3 where the URB circuitry includes: a first mixing circuit to combine the at least one seed data value with data representative of a host system internal state to provide a first internal state dependent seed data value; a first separation circuit to receive the first internal state dependent seed data value; a second mixing circuit to receive the first internal state dependent seed data value from the first separation circuit and to combine the first internal state dependent seed data value with the at least one secret key data value to provide the at least one ephemeral key data value; and a second separation circuit to receive the at least one ephemeral key data value.

Example 5 may include elements of any of examples 1 through 4 and the data protection system may further include random value generation circuitry to generate at least one random value; where the at least one random value provides at least a portion of the at least one seed data value.

Example 6 may include elements of any of examples 1 through 5 and the data protection system may further include random value generation circuitry to generate at least one pseudo-random value; where the at least one pseudo-random value provides at least a portion of the at least one seed data value.

Example 7 may include elements of any of examples 1 through 6 where the at least one seed data value comprises a plurality of seed data values; where the at least one input data portion comprises a plurality of input data portions; and where each of the plurality of input data portions provides at least a portion of a respective one of the plurality of seed data values.

Example 8 may include elements of any of examples 1 through 7 and the data protection system may further include: a cryptographic hash circuit to: receive the portion of each of the plurality of input data portions used to provide at least a portion of the respective one of the plurality of seed data values; and cryptographically hash the received portion of each of the plurality of input data portions used to provide at least a portion of the respective one of the plurality of seed data values.

According to example 9, there is provided a data protection method. The method may include: receiving, by universal resistant block (URB) circuitry, data representative of at least one seed data value; receiving, by the URB circuitry, at least one secret key data value; generating, by the URB circuitry, at least one ephemeral key data value using the received at least one secret key data value and the at least one received seed data value; receiving, by cryptographic circuitry, at least one input data portion; receiving, by cryptographic circuitry, the at least one ephemeral key data value generated by the URB circuitry; and, for each received input data portion, generating, by the cryptographic circuitry, a corresponding transformed output data portion using the respective input data portion the at least one received ephemeral key data value.

Example 10 may include elements of example 9 where receiving the data representative of the at least one seed data value includes: receiving, by universal resistant block (URB) circuitry, data representative of a plurality of seed data values; where generating the at least one ephemeral key data value using the received at least one secret key data value and the at least one received seed data value includes: generating, by the URB circuitry, a plurality of ephemeral key data values using the received at least one secret key data value and a respective one of the seed data values; where receiving the at least one input data portion further includes: receiving, by the cryptographic circuitry, a plurality of input data portions; where receiving the at least one ephemeral key data generated by the URB circuitry further includes: receiving, by the cryptographic circuitry, the plurality of ephemeral key data values generated by the URB circuitry; and where generating for each received input data portion a corresponding transformed output data portion using the respective input data portion and at least one of the one or more received ephemeral key further includes: generating, by the cryptographic circuity, for each of the plurality of input data portions a corresponding transformed output data portion using the respective input data portion and one of the plurality of ephemeral key data values.

Example 11 may include elements of any of examples 9 or 10 where receiving the at least one input data portion further includes: receiving, by the cryptographic circuitry, a plurality of input data portions; and where generating, for each received input data portion, a corresponding transformed output data portion using the respective input data portion and at least one of the one or more received ephemeral key further includes: generating, by the cryptographic circuity, for each of at least two of the plurality of input data portions at least two corresponding transformed output data portions using the respective input data portions and one of the plurality of ephemeral key data values.

Example 12 may include elements of any of examples 9 through 11 where receiving the data representative of the at least one seed data value further includes: receiving, by the URB circuitry, data representative of at least one randomly generated seed data value.

Example 13 may include elements of any of examples 9 through 12 where receiving the data representative of the at least one seed data value further includes: receiving, by the URB circuitry, data representative of at least one pseudo-random randomly generated seed data value.

Example 14 may include elements of any of examples 9 through 13 where receiving the data representative of the at least one seed data value further includes: apportioning, by the URB circuitry, the at least one input data portion to provide an input data portion to provide the at least one seed data value.

Example 15 may include elements of any of examples 9 through 14 where apportioning the at least one input data portion to provide an input data portion to provide the at least one seed data value further includes: hashing, by a cryptographic hash circuit, the input data portion to provide a hashed input data portion to provide the at least one seed data value.

According to example 16, there is provided a non-transitory storage device that includes instructions that, when executed by data protection circuitry, cause the data protection circuitry to: cause URB circuitry to generate at least one ephemeral key data value using at least one secret key data value and at least one received seed data value; and cause cryptographic circuitry to generate, for each received input data portion, an transformed output data portion using the respective input data portion and the at least one ephemeral key data value.

Example 17 may include elements of example 16 where the instructions that cause the data protection circuitry to cause the URB circuitry to generate the at least one ephemeral key data value using the at least one secret key data value and the at least one received seed data value further cause the data protection circuitry to: cause the URB circuitry to generate a plurality of ephemeral key data values using the at least one secret key data value and a respective one of a plurality of seed data values; and where the instructions that cause the data protection circuitry to cause the cryptographic circuitry to generate, for each received input data portion, the transformed output data portion using the respective input data portion and the at least one ephemeral key data value, further cause the data protection circuitry to: cause the cryptographic circuitry to generate, for each of a plurality of input data portions, a corresponding transformed output data portion using the respective input data portion and one of the plurality of ephemeral key data values.

Example 18 may include elements of any of examples 16 or 17 where the instructions that cause the data protection circuitry to cause the cryptographic circuitry to generate, for each received input data portion, the transformed output data portion using the respective input data portion and the at least one ephemeral key data value, further cause the data protection circuitry to: cause the cryptographic circuitry to generate, for each of at least two of a plurality of input data portions at least two corresponding transformed output data portions using the respective at least two input data portions and one of a plurality of ephemeral key data values.

Example 19 may include elements of any of examples 16 through 18 where the instructions that cause the data protection circuitry to cause URB circuitry to generate the at least one ephemeral key data value using the at least one secret key data value and the at least one received seed data value further cause the data protection circuitry to: cause URB circuitry to generate at least one ephemeral key data value using at least one secret key data value and at least one randomly generated seed data value.

Example 20 may include elements of any of examples 16 through 19 where the instructions that cause the data protection circuitry to cause URB circuitry to generate the at least one ephemeral key data value using the at least one secret key data value and the at least one received seed data value further cause the data protection circuitry to: cause URB circuitry to generate at least one ephemeral key data value using at least one secret key data value and at least one pseudo-randomly generated seed data value.

Example 21 may include elements of any of examples 16 through 20 where the instructions that cause the data protection circuitry to cause URB circuitry to generate the at least one ephemeral key data value using the at least one secret key data value and the at least one received seed data value further cause the data protection circuitry to: cause URB circuitry to apportion the at least one input data portion into an input data portion, the input data portion to provide the at least one seed data value.

Example 22 may include elements of any of examples 16 through 21 where the instructions that cause the data protection circuitry to cause URB circuitry to apportion the at least one input data portion into the input data portion, the input data portion to provide the at least one seed data value further causes the data protection circuitry to: cause a cryptographic hash circuit to hash the input data portion to provide a hashed input data portion to provide the at least one seed data value.

According to example 23, there is provided a system for protecting data from side channel attacks, the system being arranged to perform the method of any of examples 9 through 15.

According to example 24, there is provided a chipset arranged to perform the method of any of examples 9 through 15.

According to example 25, there is provided at least one machine readable medium comprising a plurality of instructions that, in response to be being executed on a computing device, cause the computing device to carry out the method according to any of examples 9 through 15.

According to example 26, there is provided a device configured for protecting data from side channel attacks, the device being arranged to perform the method of any of the examples 9 through 15.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A data security system, comprising:
   universal resistant block (URB) circuitry that includes:
      input interface circuitry and output interface circuitry, the URB circuitry to:
         receive data representative of at least one seed data value via the input interface circuitry;
         receive at least one secret key data value via the input interface circuitry;
         generate at least one ephemeral key data value using the at least one secret key data value and the at least one seed data value, wherein the at least one ephemeral key data value comprises a plurality of ephemeral key data values;
   cryptographic circuitry that includes: input interface circuitry and output interface circuitry, the cryptographic circuitry to:
      receive at least one input data portion via the cryptographic input interface circuitry, wherein the at least one input data portion comprises a plurality of input data portions;
      receive one or more ephemeral key data values of the plurality of ephemeral key data values generated by the URB circuitry via the cryptographic input interface circuitry; and
      generate, for at least two input data portions of the plurality of input data portions, at least two respective corresponding transformed output data portions using the at least two input data portions respectively and the one or more ephemeral key data values of the plurality of ephemeral key data values.

2. The system of claim 1:
   wherein the at least one seed data value comprises a plurality of seed data values;
   wherein the URB circuitry to generate each of the plurality of ephemeral key data values using the at least one secret key data value and a respective one of the seed data values; and
   wherein the cryptographic circuitry to transform each of the at least two input data portions using a respective one of the plurality of ephemeral key data values.

3. The system of claim 1:
   wherein the cryptographic circuitry to use a same one of the one or more ephemeral key data values to generate the at least two respective corresponding transformed output data portions.

4. The system of claim 1, wherein the URB circuitry comprises:
   splitter circuitry to receive the at least one seed data value and to generate a plurality of seed data chunks; and
   a plurality of elementary block circuits, each of the plurality of elementary block circuits to receive:
      a respective one of the plurality of seed data chunks; and
      data representative of the at least one secret key data value.

5. The system of claim 4:
   wherein the plurality of elementary block circuits includes a plurality of cascaded elementary block circuits;
      wherein a first of the plurality of cascaded elementary block circuits receives data representative of a constant value in addition to the respective one of the plurality of seed data chunks and the data representative of the at least one secret key data value; and
      wherein a last of the plurality of elementary block circuits generates an output that includes data representative of the one or more ephemeral key data values of the plurality of ephemeral key data values.

6. The system of claim 4, wherein each of the plurality of elementary block circuits comprises:
   a first mixing circuit to combine the at least one seed data value with data representative of a host system internal state to provide a first internal state dependent seed data value;
   a first separation circuit to receive the first internal state dependent seed data value;
   a second mixing circuit to receive the first internal state dependent seed data value from the first separation circuit and to combine the first internal state dependent seed data value with the at least one secret key data value to provide the one or more ephemeral key data values of the plurality of ephemeral key data values; and
   a second separation circuit to receive the one or more ephemeral key data values of the plurality of ephemeral key data values.

7. The system of claim 1, further comprising:
random value generation circuitry to generate at least one random value, wherein the at least one random value provides at least a portion of the at least one seed data value.

8. The system of claim 1, further comprising:
random value generation circuitry to generate at least one pseudo-random value, wherein the at least one pseudo-random value provides at least a portion of the at least one seed data value.

9. The system of claim 1:
wherein the at least one seed data value comprises a plurality of seed data values; and
wherein each of the plurality of input data portions provides at least a portion of a respective one of the plurality of seed data values.

10. The system of claim 9, further comprising:
a cryptographic hash circuit to:
receive the portion of each of the plurality of input data portions used to provide at least a portion of the respective one of the plurality of seed data values; and
cryptographically hash the received portion of each of the plurality of input data portions used to provide at least a portion of the respective one of the plurality of seed data values.

11. A data protection method, comprising:
receiving, by universal resistant block (URB) circuitry, data representative of at least one seed data value;
receiving, by the URB circuitry, at least one secret key data value;
generating, by the URB circuitry, at least one ephemeral key data value using the at least one secret key data value and the at least one seed data value, wherein the at least one ephemeral key data value comprises a plurality of ephemeral key data values;
receiving, by cryptographic circuitry, at least one input data portion, wherein the at least one input data portion comprises a plurality of input data portions;
receiving, by the cryptographic circuitry, the at least one ephemeral key data value generated by the URB circuitry; and
for each of at least two input data portions of the plurality of input data portions, generating, by the cryptographic circuitry, a corresponding transformed output data portion using the respective input data portion of the at least two input data portions and one of the plurality of ephemeral key data values.

12. The method of claim 11:
wherein receiving the data representative of the at least one seed data value comprises:
receiving, by the URB circuitry, data representative of a plurality of seed data values;
wherein generating the at least one ephemeral key data value using the at least one secret key data value and the at least one seed data value comprises:
generating, by the URB circuitry, the plurality of ephemeral key data values using the at least one secret key data value and a respective one of the seed data values; and
wherein generating, for each of the at least two input data portions of the plurality of input data portions, the corresponding transformed output data portion using the respective input data portion and one of the plurality of ephemeral key data values further comprises:
generating, by the cryptographic circuitry, for each of the at least two input data portions of the plurality of input data portions, the corresponding transformed output data portion using the respective input data portion of the at least two input data portions and a respective one of the plurality of ephemeral key data values.

13. The data protection method of claim 11:
wherein a same ephemeral key data value of the plurality of ephemeral key data values is used to generate the corresponding transformed output data portion for each of the at least two input data portions of the plurality of input data portions.

14. The data protection method of claim 11, wherein receiving the data representative of the at least one seed data value further comprises:
receiving, by the URB circuitry, data representative of at least one randomly generated seed data value.

15. The data protection method of claim 11, wherein receiving the data representative of the at least one seed data value further comprises:
receiving, by the URB circuitry, data representative of at least one pseudo-random randomly generated seed data value.

16. The data protection method of claim 11, wherein receiving the data representative of the at least one seed data value further comprises:
apportioning, by the URB circuitry, the at least one input data portion to provide a particular input data portion to provide the at least one seed data value.

17. The data protection method of claim 16, wherein apportioning the at least one input data portion to provide the particular input data portion to provide the at least one seed data value further comprises:
hashing, by a cryptographic hash circuit, the particular input data portion to provide a hashed input data portion to provide the at least one seed data value.

18. A non-transitory storage device that includes instructions that, when executed by data protection circuitry, cause the data protection circuitry to:
cause universal resistant block (URB) circuitry to generate a plurality of ephemeral key data values using at least one secret key data value and at least one received seed data value; and
cause cryptographic circuitry to generate, for each of at least two input data portions of a plurality of input data portions, a corresponding transformed output data portion using a respective input data portion of the at least two input data portions and one of the plurality of ephemeral key data values.

19. The non-transitory storage device of claim 18:
wherein the instructions that cause the data protection circuitry to cause the URB circuitry to generate the plurality of ephemeral key data values using the at least one secret key data value and the at least one received seed data value further cause the data protection circuitry to:
cause the URB circuitry to generate the plurality of ephemeral key data values using the at least one secret key data value and a respective one of a plurality of seed data values; and
wherein the instructions that cause the data protection circuitry to cause the cryptographic circuitry to generate, for each of the at least two input data portions of the plurality of input data portions, the corresponding transformed output data portion using the respective input data portion of the at least two input data portions and the one of the plurality of ephemeral key data values, further cause the data protection circuitry to:

cause the cryptographic circuitry to use a respective one of the plurality of ephemeral key data values to generate the corresponding transformed output data portion for each of the plurality of input data portions.

20. The non-transitory storage device of claim 18,
cause the cryptographic circuitry to use a same one of the plurality of ephemeral key data values to generate the corresponding transformed output data portion for each of the plurality of input data portions.

21. The non-transitory storage device of claim 18, wherein the instructions that cause the data protection circuitry to cause the URB circuitry to generate the plurality of ephemeral key data values using the at least one secret key data value and the at least one received seed data value further cause the data protection circuitry to:

cause the URB circuitry to generate at least one ephemeral key data value using at least one secret key data value and at least one randomly generated seed data value.

22. The non-transitory storage device of claim 18, wherein the instructions that cause the data protection circuitry to cause the URB circuitry to generate the plurality of ephemeral key data values using the at least one secret key data value and the at least one received seed data value further cause the data protection circuitry to:

cause the URB circuitry to generate at least one ephemeral key data value using at least one secret key data value and at least one pseudo-randomly generated seed data value.

23. The non-transitory storage device of claim 18, wherein the instructions that cause the data protection circuitry to cause the URB circuitry to generate the plurality of ephemeral key data values using the at least one secret key data value and the at least one received seed data value further cause the data protection circuitry to:

cause the URB circuitry to apportion at least one input data portion into a particular input data portion, the particular input data portion to provide at least one seed data value.

24. The non-transitory storage device of claim 23, wherein the instructions that cause the data protection circuitry to cause the URB circuitry to apportion the at least one input data portion into the particular input data portion, the particular input data portion to provide the at least one seed data value further causes the data protection circuitry to:

cause a cryptographic hash circuit to hash the particular input data portion to provide a hashed input data portion to provide the at least one seed data value.

\* \* \* \* \*